United States Patent [19]

Walbridge

[11] Patent Number: 4,527,656
[45] Date of Patent: Jul. 9, 1985

[54] REFUSE TRUCK CONTROL

[76] Inventor: Glenn C. Walbridge, 9312 Dawnsford Dr., Fort Wayne, Ind. 46804

[21] Appl. No.: 498,913

[22] Filed: May 27, 1983

[51] Int. Cl.³ .............................................. B60K 26/00
[52] U.S. Cl. .................................... 180/321; 180/333; 280/774
[58] Field of Search .................. 180/321, 323, 333; 280/774; 100/100; 414/909; 182/148

[56] References Cited

U.S. PATENT DOCUMENTS

| | | | |
|---|---|---|---|
| 2,624,478 | 1/1953 | Kaplan | 180/322 |
| 2,761,569 | 9/1956 | Iserman | 414/909 |
| 3,059,716 | 10/1962 | Iserman et al. | 180/321 |
| 3,391,811 | 7/1968 | Barnes | 180/324 |
| 4,160,492 | 7/1979 | Johnston | 182/148 |

Primary Examiner—Joseph F. Peters, Jr.
Assistant Examiner—Kenneth R. Rice
Attorney, Agent, or Firm—George A. Gust

[57] ABSTRACT

A rear loading refuse pickup truck is modified to include auxiliary controls operable from a platform near the rear of the truck so that a single operator can both load refuse into the truck and effect unidirectional truck operation at limited speeds between relatively close refuse pickup sites. The auxiliary controls include directional steering, transmission shifting limited between neutral and reverse, and limited accelerator actuation.

9 Claims, 12 Drawing Figures

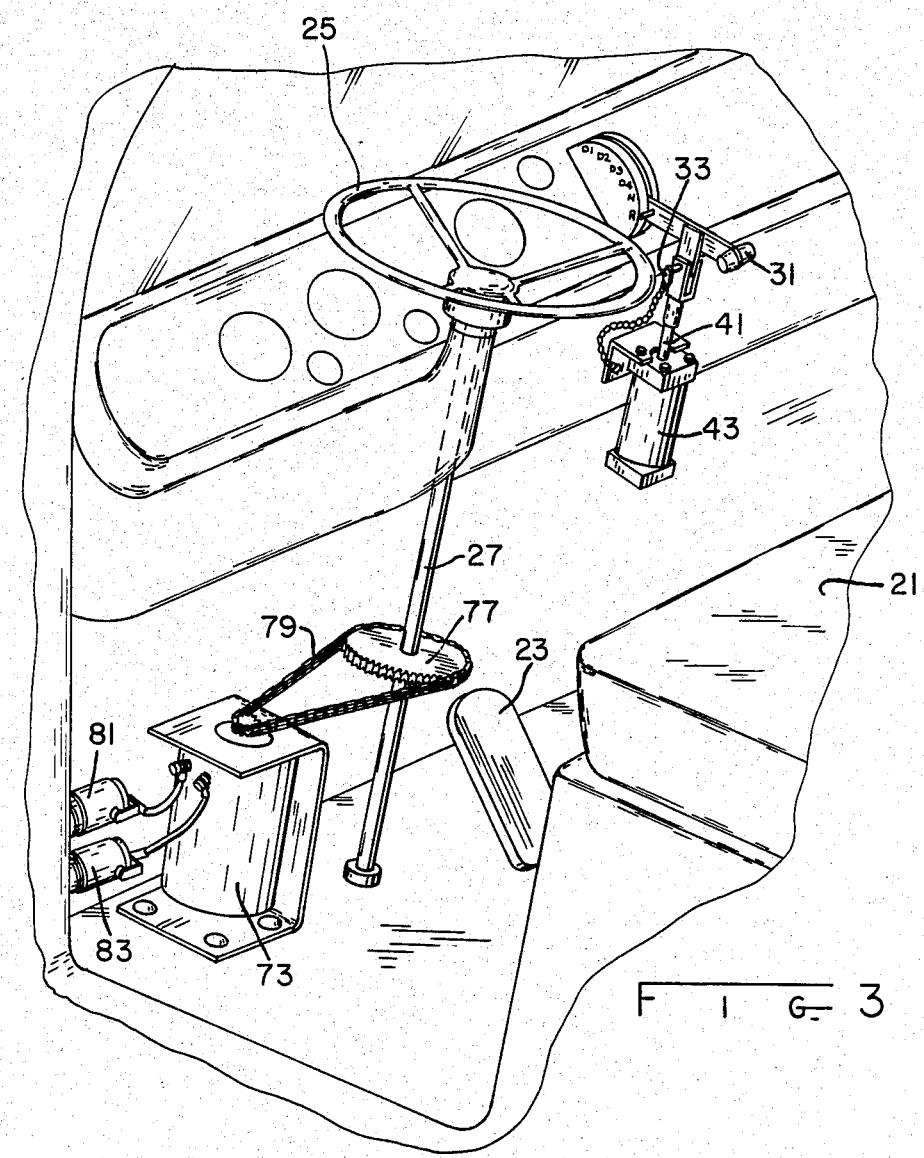
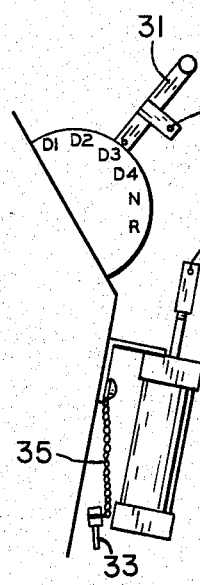 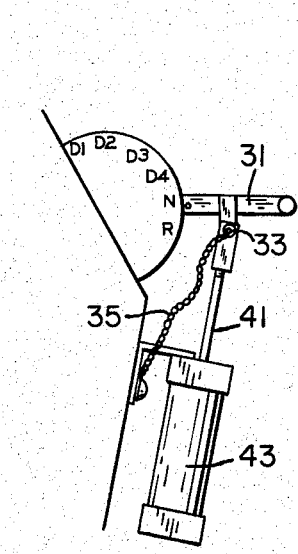 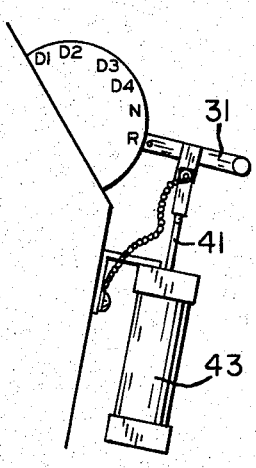 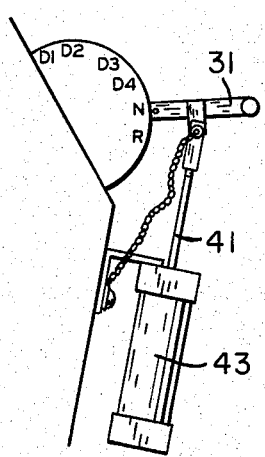

_4,527,656_

REFUSE TRUCK CONTROL

BACKGROUND OF THE INVENTION

The present invention relates generally to vehicular control and more particularly to an abbreviated set of auxiliary controls which may be added to a refuse pickup vehicle to eliminate the need for a truck driver in the cab of the vehicle when moving between the short and frequent refuse pickup locations on a refuse collecting route.

Present day refuse collecting or "garbage" trucks are frequently of a rear loading variety and the present collecting technique is for one individual to be in the cab of the truck driving the truck between pickup sites while one or two loaders or riders either walk beside or ride on a platform near the rear of the truck between pickup sites so that they are closely adjacent to both the refuse being picked up and the rear end of the truck where the refuse is received. With such an arrangement, the truck driver does nothing while the refuse is being picked up and the rider or loader does nothing between refuse pickup sites. Such an arrangement is an extremely inefficient use of manpower and substantially adds to the cost of trash collection.

Numerous suggestions have been made for auxiliary or dual controls for vehicles. For example, U.S. Pat. No. 2,624,478 discloses a self loading refuse vehicle, that is, of the type not requiring a loader or helper on the ground, wherein a complete duplication of controls is provided at an operator perch located on top of the vehicle cab and facing rearwardly. U.S. Pat. No. 3,059,716 represents an attempt to make a refuse collection operation a one man operation by providing auxiliary controls on the driver's side of the cab operable from the running board or platform directly adjacent to the normal driver's position. This arrangement, which requires both hand and foot operations, is entirely too complex and fails to locate the operator at an optimum position for loading refuse into the truck. An improvement in operator positioning may be provided if the refuse pickup vehicle is operated in reverse and the operator located near the rear thereof as in U.S. Pat. No. 3,391,811; however, in this patented arrangement a complete redesign of the truck and a complete duplication of operator controls is required and the arrangement still requires the operator to move to and from an operator's seat when stopping the truck to pickup trash. Further, each of the prior art attempts discussed represent a substantial expense and unwarranted complexity in equipping a refuse pickup truck for a one man operation.

SUMMARY OF THE INVENTION

Among the several objects of the present invention may be noted the avoidance of the above noted defects and achievement of the above noted goals; the provision of auxiliary vehicle controls operable from a platform for unidirectional truck operation at limited speeds; the provision of simplistic auxiliary vehicle controls hand operable by a rider standing on a platform which allow the rider to grip a hand hold to maintain his balance while operating the vehicle; the provision of an auxiliary control arrangement easily and economically adapted to existing trash pickup trucks; and, an overall improvement in the efficiency of a refuse pickup operation.

In general a rear loading refuse pickup truck is provided with auxiliary vehicle controls which are operable from a rider's platform near the rear of the vehicle to effect operation of the truck in one direction and at limited or reduced speeds.

Also in general and in one form of the invention the conventional operator controls for a rear loading refuse pickup vehicle are supplemented by an electric motor coupled in driving relation to the steering control of the vehicle along with an arrangement operable from the rear of the vehicle for energizing the motor; a pneumatic cylinder selectively couplable to a transmission selector control along with an arrangement also operable from the rear of the vehicle to energize the cylinder shifting the selector from a neutral position to a reverse position; and, a solenoid coupled to the accelerator control along with an arrangement operable from the rear of the vehicle to energize that solenoid and actuate the accelerator control through a limited range.

The foregoing objects and advantageous features of the present invention will be in part apparent and in part pointed out hereinafter.

BRIEF DESCRIPTION OF THE DRAWINGS

FIG. 3 is a partial perspective view of the driver's controls inside the cab of the vehicle of FIG. 1 and again modified in accordance with the teachings of the present invention;

FIG. 4 is a side elevational view of the transmission selector control and pneumatic cylinder disconnected therefrom for normal vehicular control;

FIG. 5 is a view similar to FIG. 4 but illustrating the transmission selector control coupled to the pneumatic cylinder for the pickup mode of operation of the vehicle;

FIG. 6 is a view similar to FIG. 5 but illustrating the transmission selector control actuated for movement of the vehicle between pickup sites;

FIG. 7 is a view similar to FIG. 6 but illustrating the transmission selector control position during the time that an operator is loading refuse into the vehicle;

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure of the scope of the invention in any manner.

DESCRIPTION OF THE PREFERRED EMBODIMENT

Figure 1:
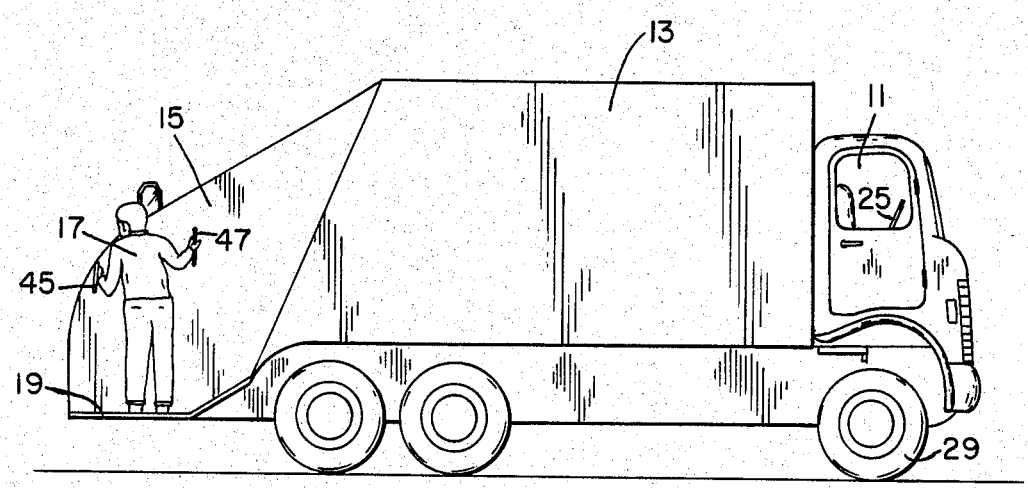
FIG. 1 is a side elevational view of a conventional rear loading refuse pickup truck modified in accordance with the present invention.

FIG. 1 illustrates a rear loading refuse pickup truck of generally conventional design having a cab 11 from which a driver controls the normal forward progress of the vehicle, a refuse accumulation area 13, and a rear loading area 15 into which refuse containers are dumped for loading into the accumulation area 13. The normal mode of operation is for a loader or rider 17 to stand on a platform 19 near the rear of the truck while a driver in cab 11 controls the forward progress between consecutive refuse pickup sites. When a site is reached, the loader 17 steps off platform 19 to load the refuse from that site into the loading bin 15. If the vehicle is operating in an area with a larger number of pickup sites, for example working both sides of a residential street, a second helper may stand on a platform similar to platform 19 on the opposite side of the truck. Thus, the normal mode of operation is to employ a minimum of two, and sometimes three people during a refuse pickup operation. The platform area 19 of the truck is illustrated in greater detail with operator 17 being absent in FIG. 2 and the interior of cab 11 is illustrated in greater detail in FIG. 3.

In FIG. 3 a driver typically seated on cushion 21 can reach brake pedal 23 with his foot as well as an accelerator pedal which is to the right of brake pedal 23 and not visible in FIG. 3. The driver may also grip a conventional steering wheel 25 which turns a downwardly extending shaft 27 for directional control of the front wheels 29 in known fashion. A transmission control selector lever 31 is also accessible to the driver in cab 11 and is as illustrated a selector control for a conventional automatic transmission having a neutral position, a reverse position and a plurality of forward speed positions.

If the refuse pickup vehicle is equiped in accordance with the present invention a single operator may drive the vehicle to the beginning of a refuse pickup route controlling the vehicle from the cab 11 in the conventional manner. When the operator reaches the beginning of his route he stops the vehicle moving the transmission selector lever 31 from one of the forward drive positions as, for example, illustrated in FIG. 4 to the neutral position whereupon a pin 33, which hangs during non-use from chain 35 simply to avoid losing pin 33, is passed through holes 37 and 39 associated respectively with the transmission selector 31 and the rod 41 of air cylinder 43 so that the transmission selector 31 may be controlled by actuation of air cylinder 43 as depicted in FIG. 5. At this point with the engine running and the transmission in neutral, the operator leaves cab 11 and assumes a position on the platform 19 near the rear of the truck, gripping hand-holds 45 and 47 to maintain his balance on platform 19.

Figure 2:
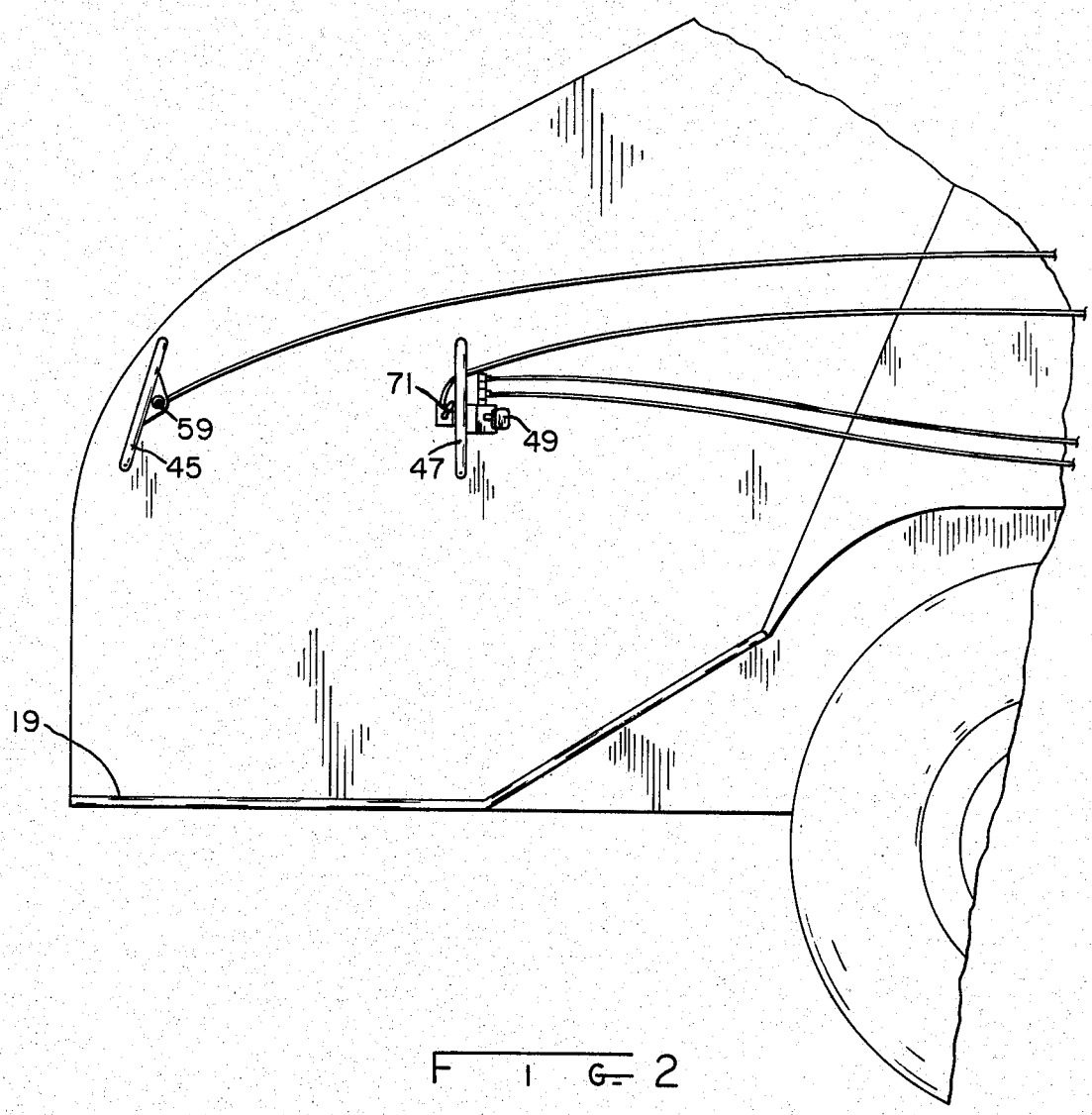
FIG. 2 is an enlarged partial view of the rear platform portion of the vehicle of FIG. 1.
Figure 9:
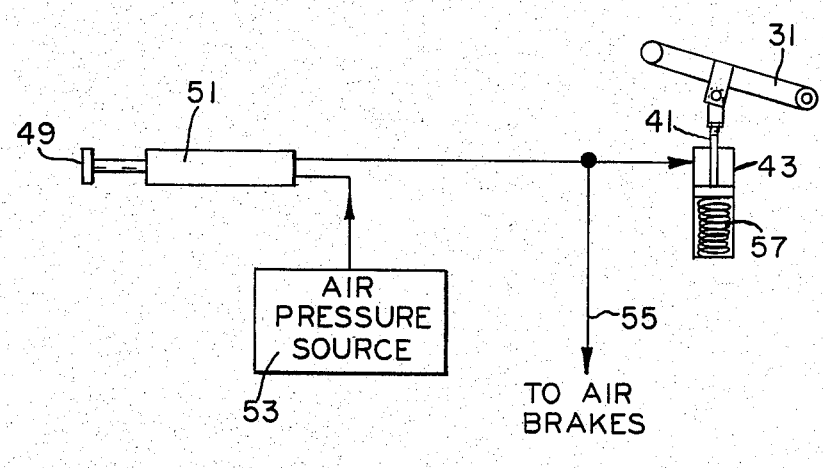
FIG. 9 is a simplified schematic illustration of the arrangement for operating the transmission selector control of FIGS. 3 through 7.
Figure 10:
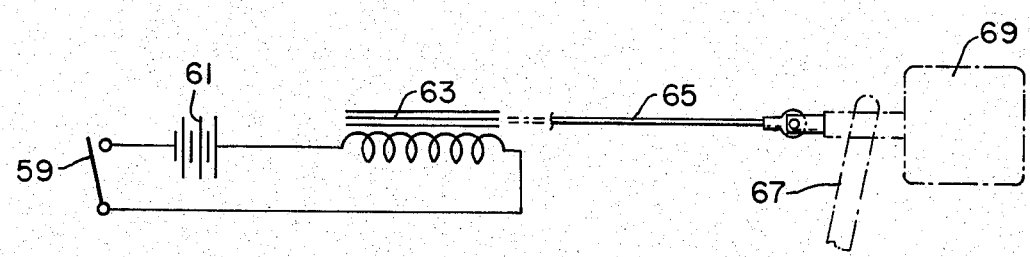
FIG. 10 is a simplified schematic illustration of the arrangement for actuating the vehicle accelerator.

To actuate the vehicle the operator next depresses button 49 of FIGS. 2 and 9. This button is associated with a valve 51 and allows air from an air pressure source 53 to pass by way of line 55 to disable the brakes on the truck as will be described in more detail subsequently and further the air is supplied to pneumatic cylinder 43 to overcome the normal biasing of spring 57 and move the piston rod 41 downwardly pulling the transmission control selector 31 from the neutral position into the reverse position as illustrated in FIG. 6. The operator next actuates a push button switch 59 of FIGS. 2 and 10 supplying electricity from source 61 to solenoid 63 which, by way of linkage 65, partially depresses the accelerator control linkage 67 enabling fuel supply from a carburetor or injection pump 69 to the engine to increase engine speed above idle. Thus, with the buttons 49 and 59 depressed the vehicle moves at a limited speed in the rearward direction under the control of the operator standing on platform 19.

Figure 8:
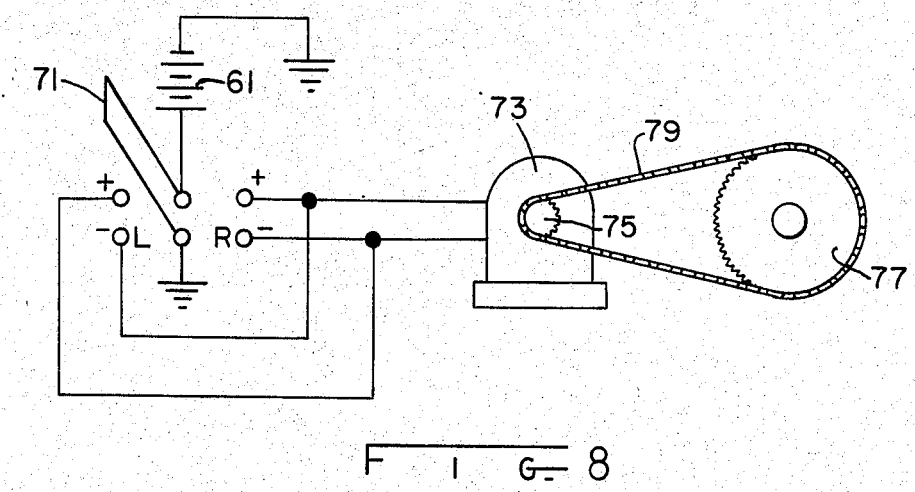
FIG. 8 is a simplified schematic illustration of the remote directional control of the vehicle.
Figure 12:
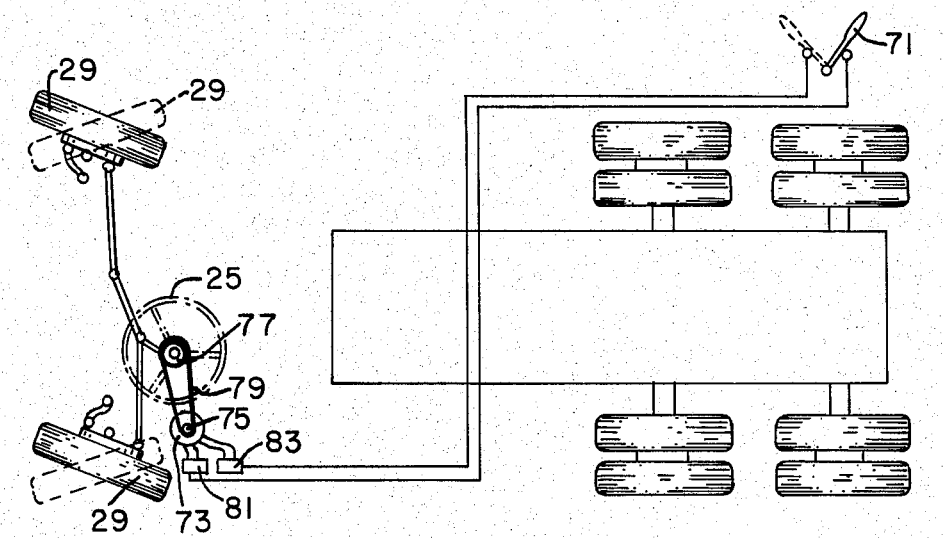
FIG. 12 is a further schematic illustration of the directional or steering control of the FIGS. 3 and 8.

Directional control is also possible from platform 19 by actuating a double-pole, double-throw switch 71 of FIGS. 2, 8, and 12. Switch 71 is normally spring biased to a neutral position and the operator may, with his thumb, move that switch to either of two front wheel turning positions. Thus, as illustrated in FIG. 8 movement of the switch 71 toward the left supplies current from the battery voltage source 61 to a reversible direct current electric motor 73 while movement of that switch 71 toward the right supplies current to the motor 73 but in the opposite sense causing motor 73 to operate in a direction opposite that induced by leftward movement of switch 71. The motor 73 is coupled by the pair of sprocket wheels 75 and 77 with drive chain 79 entrained thereabout so as to cause rotation of the steering column rod 27 of FIG. 3. In actual practice, a pair of solenoids 81 and 83 are employed so that the currents in switch 71 are control level currents rather than the heavier current required to drive motor 73. Thus the operator actuates switch 71 causing front wheels 29 to turn somewhat toward the left or right and when the desired position of those wheels is reached, the switch 71 is released and the wheels remain in that position until the operator further actuates switch 71.

If the vehicle braking system is of the Westinghouse variety, that is, where the brakes are normally applied and the braking pressure is removed by an application of air pressure to the brake cylinders, actuation of button 49 of the air control valve 51 which moves the transmission selector 31 from neutral into the reverse position as illustrated in FIG. 9 is also effective to remove the braking forces for rearward movement of the vehicle. If on the other hand the vehicle braking system is of the type where compressed air is applied to a brake cylinder to actuate or apply the brakes the braking system may be modified as illustrated in FIG. 11.

Figure 11:
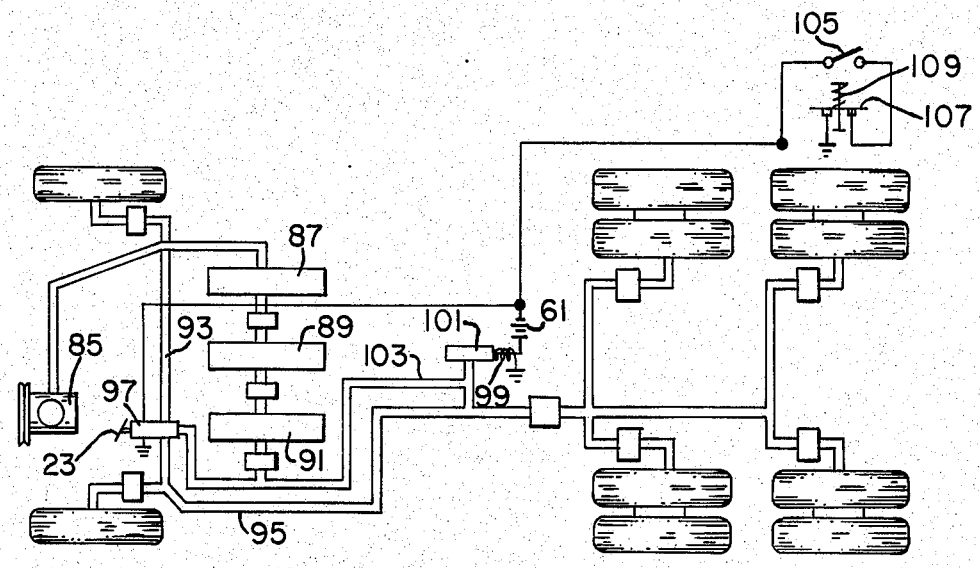
FIG. 11 is a simplified schematic illustration of the vehicle braking system as modified in accordance with the present invention; ahd.

In FIG. 11 engine rotation drives a small air compressor 85 which builds up a supply of compressed air in several compressed air reservoirs 87, 89 and 91. Normal actuation of the brake pedal 23 in cab 11 releases compressed air from the reservoir 91 by way of lines such as 93 and 95 to apply the brakes. There may also be associated with brake pedal 23 and its control valve 97 an electrical circuit for actuating a solenoid 99 and open a slave valve 101 for a more rapid response of the brakes due to venting of the air pressure from reservoir 91 by way of line 103. A pair of additional switches 105 and 107 may be added to this system so as to allow braking control from the platform 19. This may be implemented in several ways but it is desired that a switch accessible to the operator on platform 19 when the vehicle is under his control function as a deadman switch so that should the operator leave platform 19 the brakes would be automatically applied but yet that automatic brake application should not occur when the vehicle is under the control of a driver in cab 11. One way to accomplish this is for the actuation of button 49 by the operator standing on platform 19 to, by way of line 55, also close switch 105. Under these circumstances the operator would then need to maintain switch 107 open against the normal spring biasing of spring 109 in order to prevent actuation of solenoid 99 and the application of the brakes. Switch 107 and switch 59, which controls the depression of the accelerator pedal, could be combined into a single control of the push button switch variety so that the operator would need only to maintain button 59 depressed with his left hand so as to both depress the accelerator somewhat and maintain the brakes in their unapplied state. Other variations are possible. For example, the switch 59 and switch 105 could be combined into a single structure so that when the operator depressed the button associated with switch 59 switch 105 was also closed and then the control button 49 and its associated air valve 51 could be of the spring loaded variety requiring continuous depression by the operator so as to maintain the transmission in its reverse position and by way of line 55 maintain an air pressure actuated switch 107 open preventing the application of the brakes. Several other variations are possible including some sort of automatic closure of switch 105 when the operator leaves cab 11 while the engine is running. For example switch 105 could be combined with pin 33 so that placing that pin in holes 37 and 39 closes the switch.

In summary then, a single operator can operate the refuse truck in a reverse direction and at slow speeds having control only on whether the transmission selector is in neutral or reverse, the accelerator pedal is at idle or moderately sped up, the brakes are controlled by some sort of deadman switch, and directional control is achievable by actuating a switch, which is normally biased to a neutral position, toward one or the other of its closed positions thereby causing a right or left turning of the wheels of the vehicle.

In a working embodiment of this invention, the following listed components were used, these being given as exemplary only and not as limitative of the invention.

| Air valve 49, 51 | Bendix Model TW-1 air valve 229611 |
| Back-up Cylinder 43 | APSCO model C-366 |
| Valve 101 | Bendix R-12 relay, No. 102626 |
| Switch 71 | Ransey F & R Electric Winch Control No. 282001 |
| Motor 73 | Ramsey Starter No. 458001 |
| Solenoid 99 | Bendix No. BW 277147 |
| Solenoids 81, 83 | Ramsey solenoid pack No. 278,027 |

All Bendix components were obtained from Bendix-Westinghouse Corp. of Oklahoma City, Okla.; all Ramsey components from Ramsey Corp. of Tulsa, Okla., and the APSCO components from APS Company, Tulsa, Okla.

The sprocket ratio from sprockets 77, 75 was seven to one (7-1), and the chain 79 was a standard size No. 35.

From the foregoing it is now apparent that a novel scheme for controlling a refuse pickup truck from the rear of that truck and by a single operator having limited but adequate control over the vehicle has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. In a rear loading refuse pickup truck of the type having an automatic transmission and a platform near the rear of the truck normally receiving a rider who steps off the platform to load refuse and then steps back onto the platform to be driven by a truck driver to the next refuse pickup site with the rider normally standing on the platform gripping at least one pair of hand holds to maintain his balance, the improvement comprising auxiliary vehicle controls positioned in close proximity to respective hand holds operable from the paltform for undirectional truck operation of limited speeds the auxiliary controls comprising first switch means for controlling the truck transmission between neutral and reverse, second switch means for controlling a steering mechanism of the truck, the second switch means comprising a double-throw switch normally biased to an open position and requiring continuous actuating force to maintain the switch in either closed position, and truck brake actuating means, all said controls positioned in close proximity to respective hand holds enabling the rider to control the truck solely by hand operations in a standing operation while maintaining his hand hold grip.

2. The improvement of claim 1 wherein the truck has a driver's cab with conventional steering, accelerator, brake and automatic transmission selector controls, the improvement further comprising a reversible direct current motor, a first sprocket wheel drivable by the motor and second sprocket wheel mounted on the steering control, and a chain entrained about and coupling the first and second sprocket wheels together so that steering may optionally be effected by selective energization of the motor.

3. The improvement of claim 2 further including remote actuable means disposed within the cab adjacent to the automatic transmission selector control and means for optionally coupling the selector control and actuable means together for remote operation of the selector control.

4. The improvement of claim 3 wherein the remote actuable means comprises a pneumatic cylinder operable when coupled to the selector control to move the control only between neutral and reverse.

5. The improvement of claim 4 wherein the auxiliary controls include an air valve selectively operable by the rider and coupled to the cylinder to shift the transmission selector into reverse and a double-pole double-throw switch normally biased to an open position and selectly operable by the rider to one of two closed positions for energizing the direct current motor to rotate the steering control.

6. The improvement of claim 5 wherein the auxiliary controls further includes a dead man switch normally biased to a brake actuating position and moveable therefrom by a rider when controlling the truck from the platform.

7. In a rear loading refuse pickup vehicle of the type having an automatic transmission; a driver's cab with steering, accelerator, brake and automatic transmission selector controls; and a platform near the rear of the vehicle upon which a refuse loading rider may stand and ride between refuse pickup sites; the improvement for allowing the rider to control vehicle operation from the platform in the absence of a driver in the cab comprising:

an electric motor coupled in driving relation to the steering control;

first means operable from the platform for energizing the motor;

a pneumatic cylinder selectively coupled to the transmission selector control;

second means operable from the platform to energize the cylinder and shift the selector from one position to another position;

solenoid means coupled to the accelerator control;

third means operable from the platform to energize the solenoid means and actuate the accelerator control; and means operable when the vehicle is under the control of a rider on the platform to apply the vehicle brakes when that rider leaves the platform, the means for applying the vehicle brakes and said second means being commonly controlled.

8. The improvement of claim 7 further comprising a dead man control depressable by the rider to both actuate the second means to shift the transmission selector control from neutral into reverse and prevent application of the vehicle brakes.

9. The improvement of claim 7 wherein the vehicle includes handholds which the rider may grip to maintain his balance while standing on the platform, each of said first, second and third means being positioned closely adjacent a handhold so that the rider can actuate the controls without releasing this grip on the handhold.

* * * * *